US009394944B2

(12) United States Patent
Bienfang et al.

(10) Patent No.: US 9,394,944 B2
(45) Date of Patent: Jul. 19, 2016

(54) THRUST RAIL AND SWING GEAR ASSEMBLY FOR A MINING VEHICLE

(71) Applicant: Caterpillar Global Mining LLC, Oak Creek, WI (US)

(72) Inventors: David T. Bienfang, Mukwonago, WI (US); Gurbachan S. Bumraw, Franklin, WI (US); Carl D. Gilmore, South Milwaukee, WI (US); Philip R. Strydom, Oak Creek, WI (US); Christopher R. Wanasek, Waterford, WI (US); Jeanne Yaunke, Delavan, WI (US)

(73) Assignee: Caterpillar Global Mining LLC, South Milwaukee, WI (US)

( * ) Notice: Subject to any disclaimer, the term of this patent is extended or adjusted under 35 U.S.C. 154(b) by 72 days.

(21) Appl. No.: 14/325,947

(22) Filed: Jul. 8, 2014

(65) Prior Publication Data
US 2016/0010694 A1    Jan. 14, 2016

(51) Int. Cl.
*F16C 19/30* (2006.01)
*F16C 35/06* (2006.01)
*E02F 9/12* (2006.01)
*F16C 33/58* (2006.01)
*E02F 3/46* (2006.01)

(52) U.S. Cl.
CPC . *F16C 35/06* (2013.01); *E02F 3/46* (2013.01); *E02F 9/121* (2013.01); *E02F 9/123* (2013.01); *F16C 19/30* (2013.01); *F16C 33/581* (2013.01); *F16C 2300/14* (2013.01); *F16C 2350/26* (2013.01)

(58) Field of Classification Search
CPC ...... F16C 19/30; F16C 33/523; F16C 33/526; F16C 33/583; F16C 2300/14; F16C 2350/26; E02F 19/121; B66C 23/84; Y01T 29/49691

USPC ......... 384/590, 593, 615, 617, 618, 621, 622; 212/175, 247, 253; 29/898.07; 414/744.2

See application file for complete search history.

(56) References Cited

U.S. PATENT DOCUMENTS

| | | | | |
|---|---|---|---|---|
| 579,857 A * | 3/1897 | Bradshaw | ............... | F16C 19/30 384/593 |
| 2,049,654 A * | 8/1936 | Ljungkull | ............... | F16C 33/54 384/621 |
| 2,460,810 A * | 2/1949 | Davidson | ................ | B66C 23/84 384/591 |
| 2,513,726 A * | 7/1950 | Huston | ................... | B66C 23/84 212/253 |
| 3,338,425 A * | 8/1967 | Schneider | ............... | B66C 23/84 212/253 |
| 3,888,357 A | 6/1975 | Bauer et al. | | |

(Continued)

FOREIGN PATENT DOCUMENTS

| | | |
|---|---|---|
| JP | 08150840 | 6/1996 |
| KR | 20090070563 A | 7/2009 |
| WO | WO 2013/081610 A1 | 6/2013 |

*Primary Examiner* — Marcus Charles

(57) ABSTRACT

A support rail for a swing gear includes a first flange having a first surface configured to engage a substantially horizontal top face of the swing gear, a second flange positioned opposite the first flange, and a column portion intersecting the first flange and the second flange such that the column portion is approximately perpendicular to the first and second flanges. The column portion includes a second surface configured to engage a substantially vertical inner surface of the swing gear. The first surface and the second surface are configured to substantially inhibit a rotation of the support rail relative to the swing gear by engaging the top face and the inner surface simultaneously.

20 Claims, 6 Drawing Sheets

(56) References Cited

U.S. PATENT DOCUMENTS

| | | | |
|---|---|---|---|
| 3,972,378 A | 8/1976 | Houriez et al. | |
| 3,985,406 A * | 10/1976 | Baron | B66C 23/84 384/618 |
| 4,037,894 A * | 7/1977 | Sankey | B66C 23/84 384/618 |
| 4,239,305 A * | 12/1980 | Baron | E02F 9/121 384/593 |
| 4,248,488 A * | 2/1981 | Sable | B66C 23/84 384/606 |
| 4,446,977 A * | 5/1984 | McClain | B66C 23/84 104/46 |
| 4,524,875 A | 6/1985 | Jamieson | |
| 4,582,436 A * | 4/1986 | Merron | E02F 9/121 384/619 |
| 4,622,860 A * | 11/1986 | Cametti | E02F 9/121 212/175 |
| 4,648,729 A * | 3/1987 | Jones | B66C 23/84 384/615 |
| 4,723,852 A * | 2/1988 | Ehret | E02F 9/006 29/898.07 |
| 5,134,863 A * | 8/1992 | Hanna | D04B 9/14 384/607 |
| 5,205,657 A | 4/1993 | Feld | |
| 5,440,970 A | 8/1995 | Tonsor | |
| 5,676,471 A * | 10/1997 | Kallenberger | B66C 23/84 384/593 |
| 6,266,901 B1 | 7/2001 | Kanda et al. | |
| 6,752,282 B2 | 6/2004 | Brown et al. | |
| 8,251,020 B2 | 8/2012 | Matthews | |
| 8,573,852 B2 | 11/2013 | Knuth | |
| 2010/0239421 A1* | 9/2010 | Boston | B64C 11/06 416/136 |
| 2012/0121215 A1 | 5/2012 | Knuth | |
| 2013/0287331 A1 | 10/2013 | Sekido | |

* cited by examiner

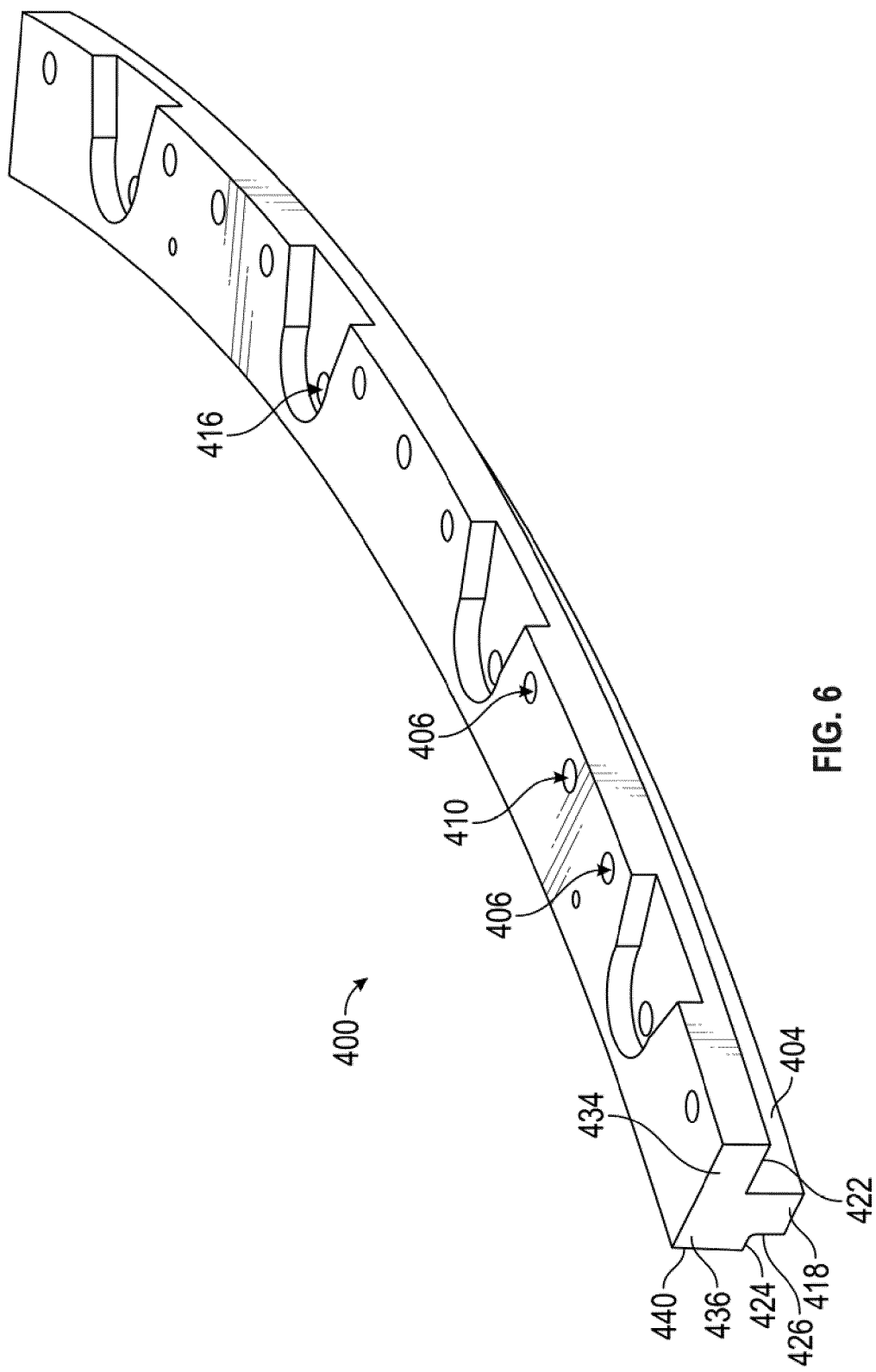

THRUST RAIL AND SWING GEAR ASSEMBLY FOR A MINING VEHICLE

TECHNICAL FIELD

This disclosure relates to mining vehicles having an upper frame that is rotatable relative to a lower frame, and particularly to swing assemblies for facilitating rotation of the upper frame.

BACKGROUND

This section is intended to provide a background or context to the invention recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Mining shovels and other large industrial vehicles may have an upper frame configured to rotate relative to a lower frame via a swing gear assembly, such as to move a coupled work implement (e.g., a dipper shovel) to a particular location. Often, the swing gear assembly includes a swing gear (e.g., a swing rack) coupled to the lower frame, a series of rollers configured to facilitate rotation of the upper frame relative to the lower frame, and a thrust rail (i.e., a support rail) coupled to the swing gear. The thrust rail may be configured to interface with both the swing gear and the rollers, as well as to retain the rollers in a desired position. The swing gear may also include a machined inner surface intended to retain the thrust rail and the rollers.

During operation of the mining shovel (e.g., as the upper frame is rotated), the rollers may be subject to a pressure load due to the impact or weight of the upper frame, such that the rollers are pushed radially outward from the swing gear assembly. Due to the load, the rollers and the thrust rail may be biased in a radially outward direction, and the fasteners coupling the components of the swing gear assembly may be stretched or broken. Further, the thrust rail often extends above the inner surface of the swing gear, resulting in a bending moment on a top portion of the inner surface of the swing gear. The outward radial force of the rollers may thus cause wear to the rollers, the thrust rail, and/or the inner surface of the swing gear, which may reduce the efficiency or effectiveness of the mining shovel and may requiring replacement of a portion of the swing gear assembly.

Swing gear assemblies may include devices configured to impede the radial thrust of an associated roller circle. An example of such a device can be found in U.S. Patent Publication No. 2013/0287331, published Oct. 31, 2013, for "Thrust Roller Bearing," which discloses a thrust cage for retaining a plurality of rollers. The thrust cage includes a plurality of separate cage bodies configured to retain the individual rollers in a roller accommodating space. However, the cage bodies do not include both a horizontal and a vertical surface configured to provide support, and the cage bodies may not inhibit a rotational movement of the rollers relative to an adjacent component.

SUMMARY

An embodiment of the present disclosure relates to a support rail for a swing gear. The support rail includes a first flange having a first surface configured to engage a substantially horizontal top face of the swing gear, a second flange positioned opposite the first flange, and a column portion intersecting the first flange and the second flange such that the column portion is approximately perpendicular to the first and second flanges. The column portion includes a second surface configured to engage a substantially vertical inner surface of the swing gear. The first surface and the second surface are configured to substantially inhibit a rotation of the support rail relative to the swing gear by engaging the top face and the inner surface simultaneously.

Another embodiment of the present disclosure relates to a swing gear assembly. The swing gear assembly includes a swing gear having a substantially horizontal top face and a substantially vertical inner surface, and a support rail coupled to the swing gear. The support rail includes a first flange having a first surface engaging the top face, a second flange positioned opposite the first flange, and a column portion intersecting the first flange and the second flange such that the column portion is approximately perpendicular to the first and second flanges. The column portion includes a second surface engaging the inner surface. The first surface and the second surface are configured to substantially inhibit a rotation of the support rail relative to the swing gear by engaging the top face and the inner surface simultaneously.

Another embodiment of the present disclosure relates to an industrial vehicle. The industrial vehicle includes a lower frame, an upper frame configured to rotate relative to the lower frame, and a swing gear assembly coupled to the lower frame and the upper frame and configured to facilitate a rotation of the upper frame relative to the lower frame. The swing gear assembly includes a swing gear having a substantially horizontal top face and a substantially vertical inner surface, and a support rail coupled to the swing gear. The support rail includes a first flange having a first surface engaging the top face, a second flange positioned opposite the first flange, and a column portion intersecting the first flange and the second flange such that the column portion is approximately perpendicular to the first and second flanges. The column portion includes a second surface engaging the inner surface, and the first surface and the second surface are configured to substantially inhibit a rotation of the support rail relative to the swing gear by engaging the top face and the inner surface simultaneously.

BRIEF DESCRIPTION OF THE DRAWINGS

The disclosure will become more fully understood from the following detailed description, taken in conjunction with the accompanying figures, wherein like reference numerals refer to like elements, in which:

FIG. 6 is an isolated perspective view of the support rail, according to an exemplary embodiment.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Figure 1:
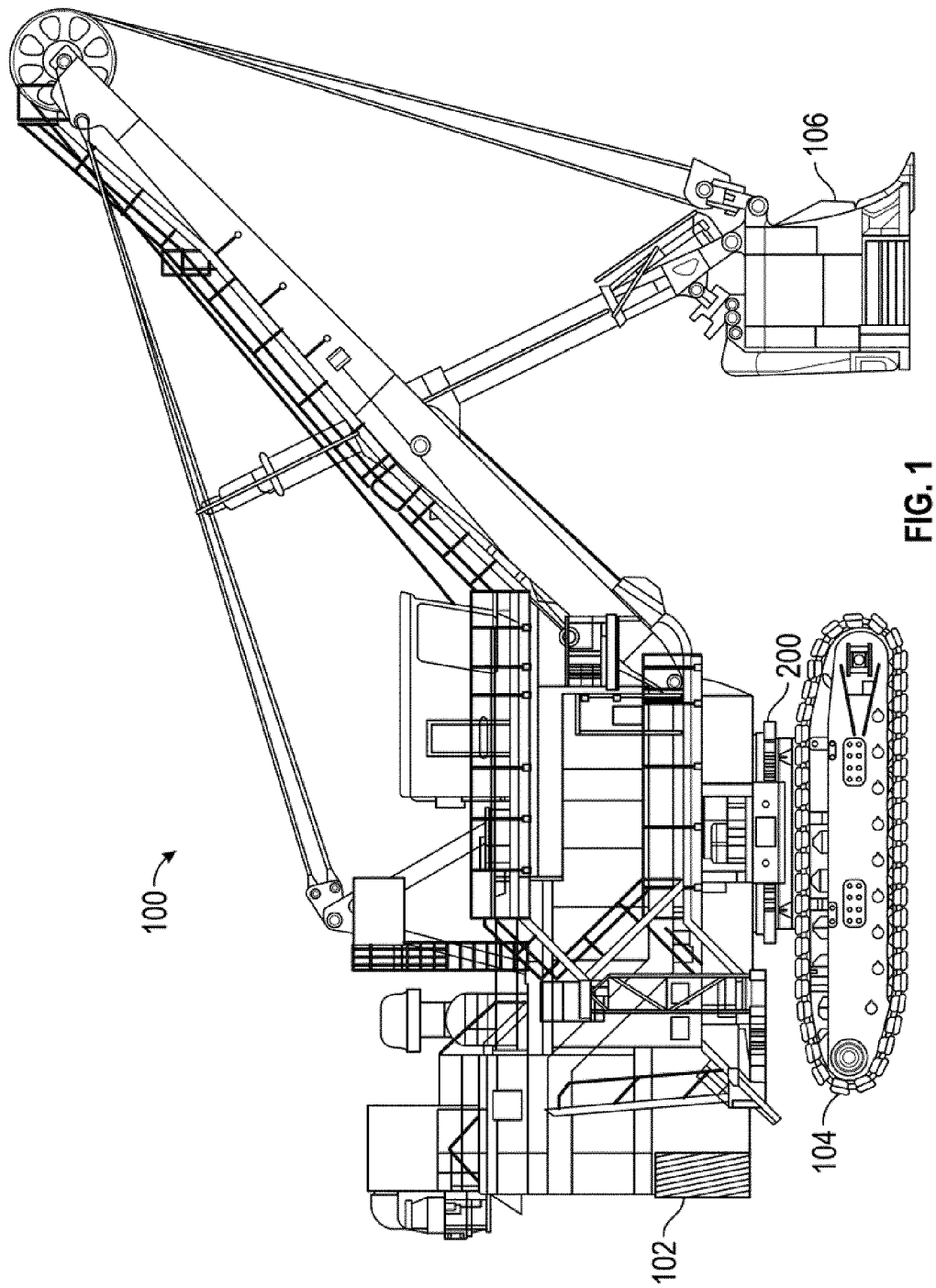
FIG. 1 is a side view of a mining vehicle having a swing gear assembly, according to an exemplary embodiment.

Referring to FIG. 1, a rope shovel 100 is shown, according to an exemplary embodiment. The rope shovel 100 includes an upper frame 102 and a lower frame 104. The upper frame 102 is rotatably coupled to the lower frame 104 by a swing gear assembly 200 (e.g., swing assembly, swing plate assembly, etc.), such that the upper frame 102 is configured to rotate relative to the lower frame 104. The rope shovel 100 may also include a dipper assembly 106 or another similar work implement. The dipper assembly 106 may be rotated with the upper frame 102 in relation to the lower frame 104. As an example, the upper frame 102 may be rotated relative to the lower frame 104 in order to move the dipper assembly 106 to a particular location within a work site, such as to scoop or transport dirt or other mining material. Although the disclosure is shown and described by way of example with reference to an electric rope shovel 100, the disclosure is also applicable for use with any equipment having an upper frame that rotates relative to a lower frame via a swing gear assembly, such as mining shovels, draglines, excavators, etc., all of which are intended to be within the scope of this disclosure.

Figure 2:
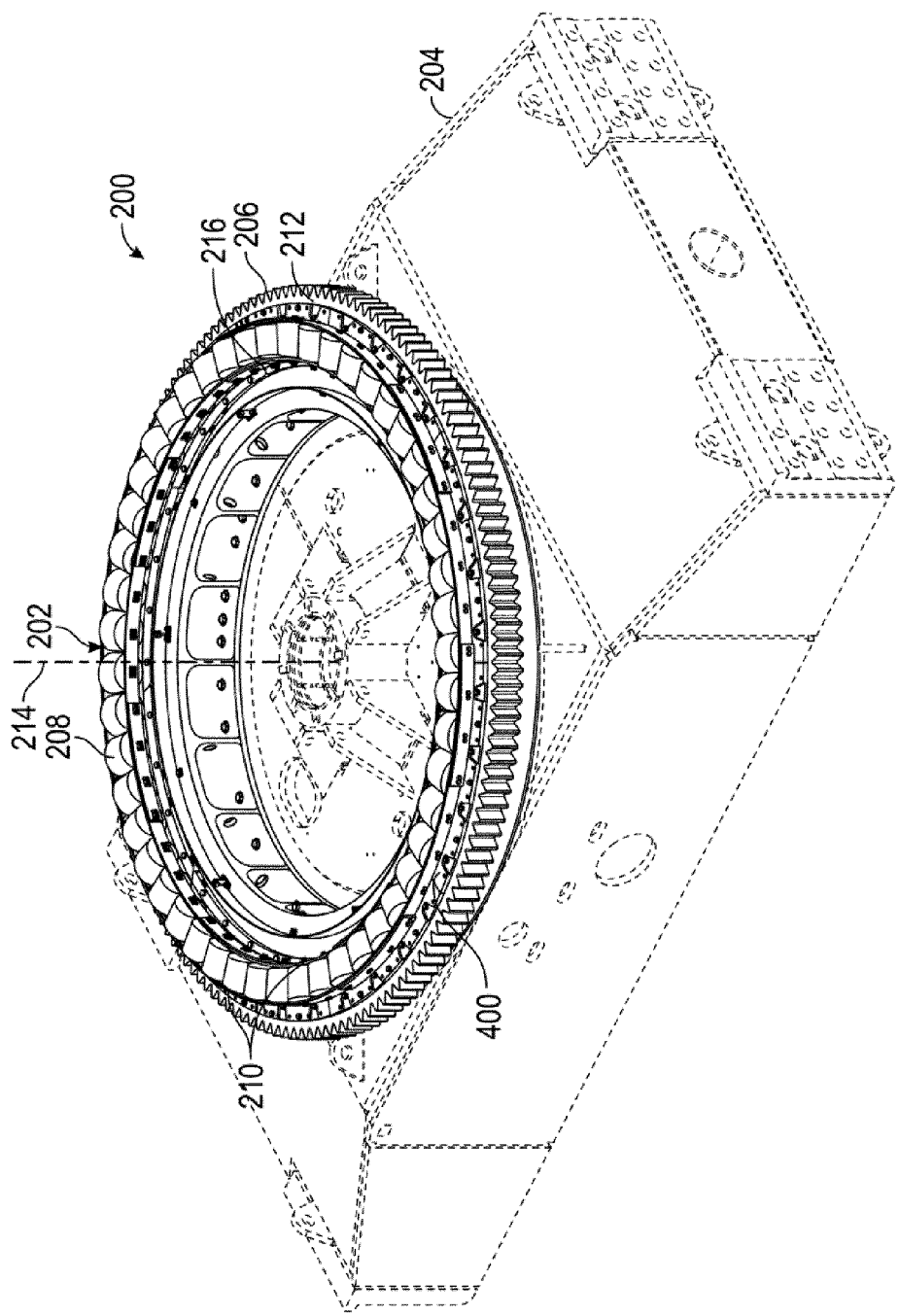
FIG. 2 is a perspective view of a swing gear assembly for a mining vehicle, including a support rail, according to an exemplary embodiment.
Figure 3:
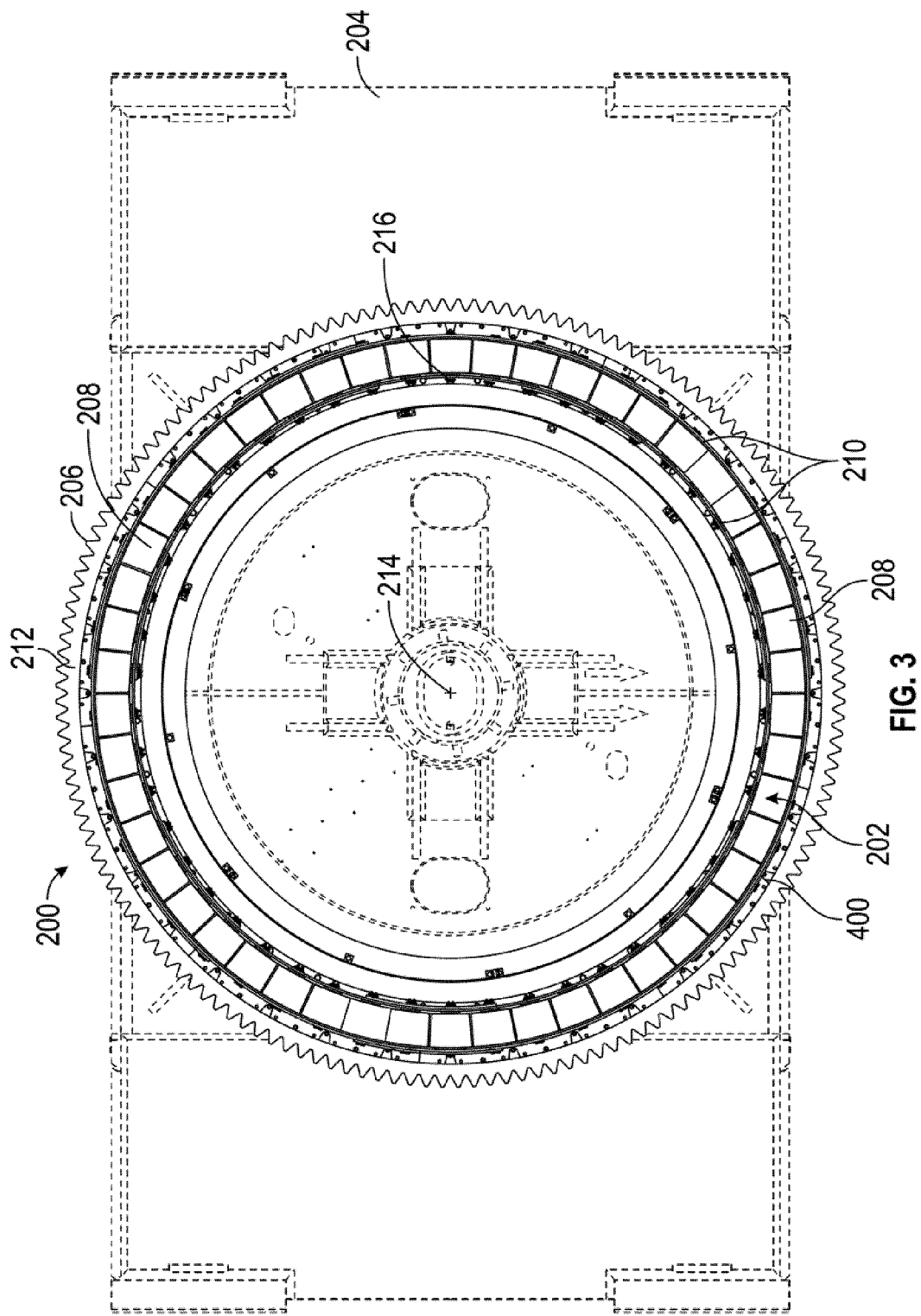
FIG. 3 is a top view of the swing gear assembly of FIG. 2.

Referring now to FIGS. 2 and 3, the swing gear assembly 200 is shown with more particularity, according to an exemplary embodiment. The swing gear assembly 200 includes a swing gear 206 (e.g., a swing rack). In this embodiment, the swing gear 206 has an approximately circular shape to provide a 360 degree rotation for the upper frame 102 about a central axis 214. The swing gear assembly 200 may include a frame 204 for coupling the swing gear 206 to the lower frame 104, or the swing gear 206 may be configured to otherwise couple to the lower frame 104. The swing gear 206 includes a top face 212 (e.g., surface) extending around an outer edge of the swing gear 206, and a lower rail 216 positioned inside of the top face 212.

The swing gear assembly 200 also includes at least one support rail 400 (e.g., a thrust rail) coupled to the swing gear 206 and contacting more than one surface of the swing gear 206. In the illustrated embodiment of FIGS. 2 and 3, the swing gear assembly 200 includes a support rail assembly having a plurality of support rails 400 (e.g., eight support rails 400) that are substantially identical and shaped to match a curvature of the swing gear 206. The support rails 400 are coupled to an inner surface of the swing gear 206, extending end to end along the entirety of an inner circumference of the swing gear 206. In this embodiment, the support rail assembly is substantially circular in shape to match the shape of the swing gear 206. For instance, an outer circumference of the support rail assembly may be proportionate with or correspond to a circumference of the swing gear 206. In other embodiments, the support rail assembly may include a single support rail having a circular shape and being configured to extend along the inner circumference of the swing gear 206 (i.e., such that a single component is sized and shaped according to the plurality of support rails 400 shown in FIG. 2).

A roller circle 202 rests atop the swing gear 206 (e.g., such that the roller circle 202 engages the lower rail 216). The roller circle 202 includes a series of rollers 208. The rollers 208 may be configured to receive or otherwise interface with the upper frame 102. The roller circle 202 (e.g., the rollers 208) may act as a bearing between the swing gear 206 and the upper frame 102, facilitating rotation of the upper frame 102 about the axis 214 (and along the rollers 208) with respect to the lower frame 104. The rollers 208 may be configured to roll independently of the support rail 400 and the swing gear 206, such as in a direction opposite or perpendicular to a rotation of the swing gear 206. The rollers 208 may be arranged to match a dimension of the swing gear 206, such as being arranged to match or correspond with a circumference of the swing gear 206. The roller circle 202 may have a substantially circular shape in order to facilitate a 360 degree rotation of the upper frame 102 about the central axis 214. The roller circle 202, including the rollers 208, may also be sized and/or shaped according to one or more dimensions of the upper frame 102.

The roller circle 202 may also include one or more brackets 210 for housing and/or coupling together the set of rollers 208. The brackets 210 may be configured to provide a path for guiding and/or maintaining the rollers 208 within a particular arrangement, such as to maintain alignment of the rollers 208 relative to the upper frame 102. The brackets 210 may also at least partially retain the rollers 208, such as in response to a radially outward movement of the rollers 208. The brackets 210 may be shaped according to a desired arrangement of the rollers 208 and/or a shape of the swing gear 206. In an exemplary embodiment, the brackets 210 are arranged in a substantially circular shape in order to match the shape of the swing gear 206 and the desired arrangement of the rollers 208, as well as to facilitate a 360 degree rotation of the upper frame 102 relative to the lower frame 104. The swing gear 206, the support rail assembly, and the roller circle 202 may share one or more dimensions in order to fit together according to the illustrated embodiment. For instance, an outer circumference formed by the rollers 208, an inner circumference of the support rail assembly, and a circumference of the brackets 210 may be approximately equal to each other.

In an exemplary embodiment, the support rails 400 (i.e., the support rail assembly) are configured to retain a relative position of the rollers 208 (i.e., retain the rollers 208) within the support rail assembly. For instance, when the upper frame 102 rests on the rollers 208, the rollers 208 and/or other components of the roller circle 202 may receive a force, or "impact load," due to the weight of the upper frame 102. The impact load applied by the upper frame 102 may cause the rollers 208 to push out (i.e., move radially outward) from the central axis 214, applying a "thrust load" to the support rails 400. The support rails 400 are configured to counteract the thrust load of the rollers 208 and at least partially inhibit radially outward movement of the rollers 208 and/or the roller circle 202. The thrust load may be transferred to the support rails 400 from the rollers 208, causing the support rails 400 to apply the thrust load to the swing gear 206 in a radially outward direction (e.g., away from the central axis 214). In an exemplary embodiment, the support rails 400 are configured to transfer the thrust load through the support rails 400 from the roller circle 202 to the swing gear 206 while inhibiting a rotation of the support rails 400 relative to the swing gear 206, and also inhibiting a bending moment applied to the swing gear 206 due to the support rails 400.

Figure 4:
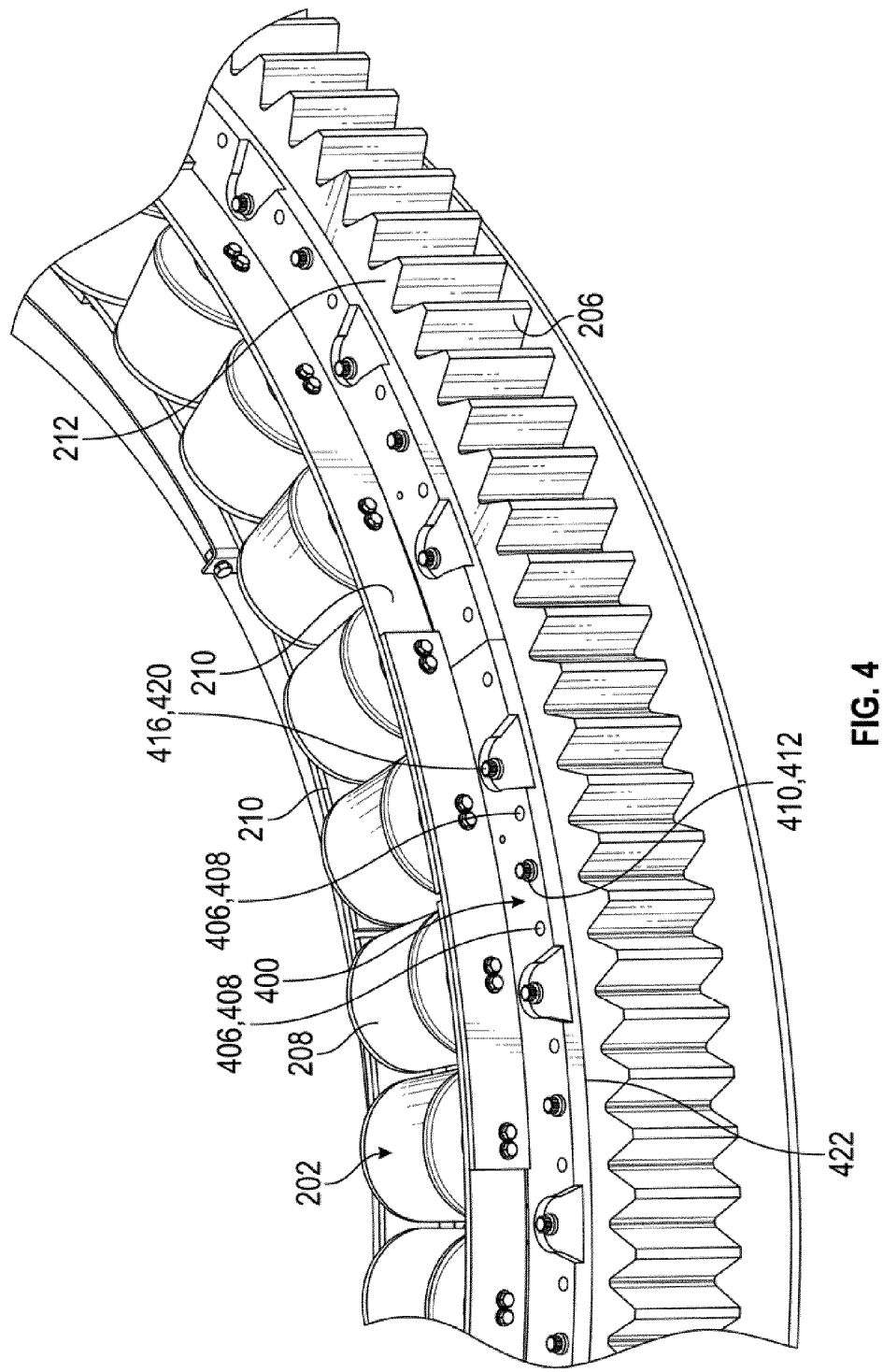
FIG. 4 is a perspective view of a swing gear assembly, including a support rail, according to an exemplary embodiment.
Figure 5:
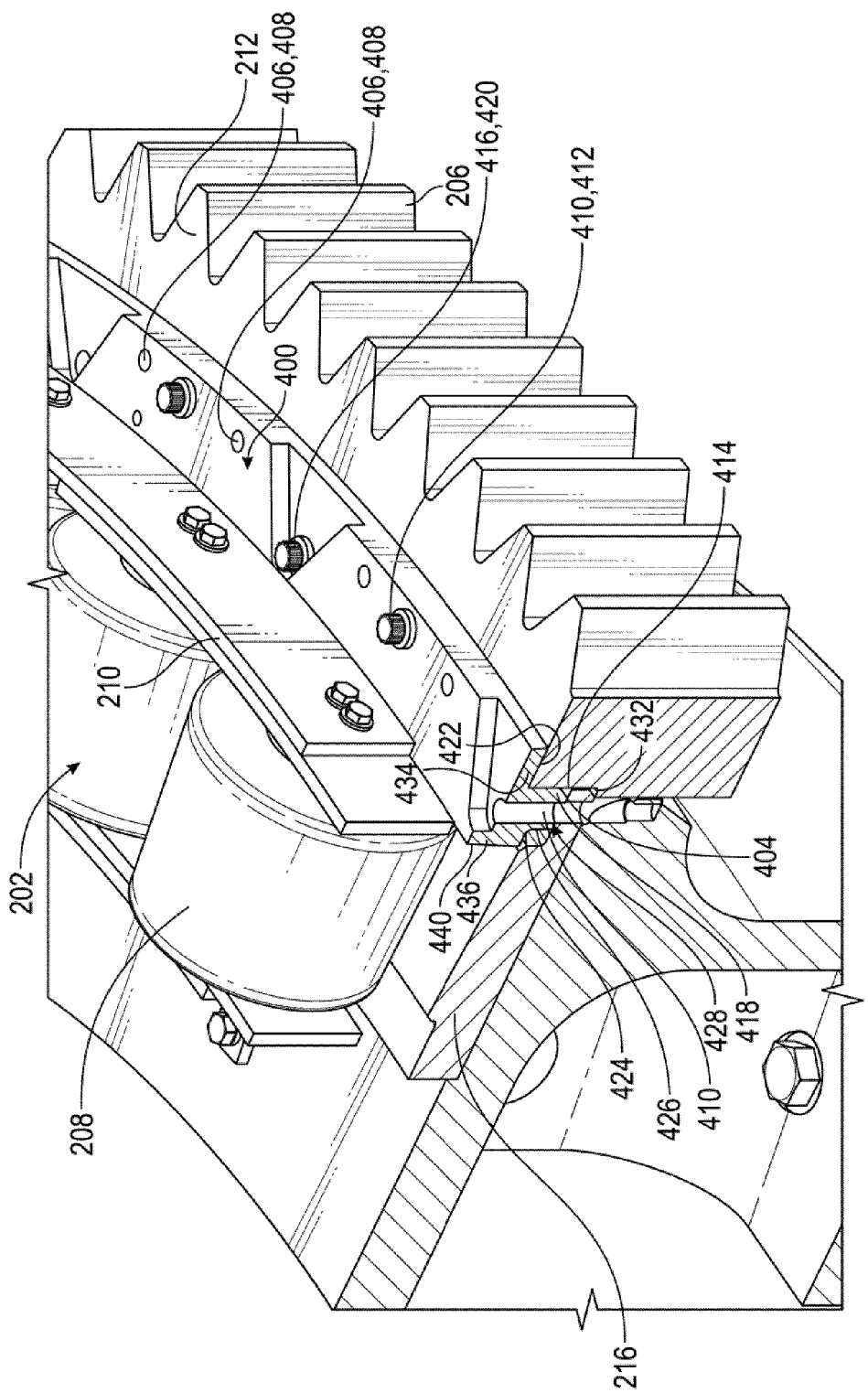
FIG. 5 is a perspective and cross-sectional view of the swing gear assembly, according to an exemplary embodiment.

Referring now to FIGS. 4 through 6, the support rail 400 is shown with more particularity, according to an exemplary embodiment. FIG. 4 shows the support rail 400 coupled to the swing gear 206 as part of the swing gear assembly 200. FIG. 5 shows a cross-sectional view of the swing gear assembly 200, including the interaction between the support rail 400 and the swing gear 206. FIG. 6 shows an isolated view of the support rail 400. As shown in FIGS. 5 and 6, the support rail 400 may be approximately T-shaped. In the illustrated embodiment, for instance, the support rail 400 includes a first flange 434 opposite a second flange 436. The first flange 434 and the second flange 436 are intersected by a column portion 418. In this embodiment, the first flange 434 and the second flange 436 are substantially horizontal (according to FIGS. 5 and 6) and are perpendicular to the substantially vertical column portion 418. The first flange 434 and the second flange 436 are positioned opposite each other and extend in opposite directions from the column portion 418 such that the flanges 434 and 436 and the column portion 418 form an approximate T-shape.

As shown in FIG. 5, when the support rail 400 is coupled to the swing gear 206, the first flange 434 is positioned outside of the column portion 418, relative to the central axis 214, and extends outward from the column portion 418 to cover at least a portion of the top face 212 of the swing gear 206. The first flange 434 is configured to engage (e.g., contact, interlock with, interface with, etc.) the swing gear 206 to prevent movement (e.g., rotation) of the support rail 400 relative to the swing gear 206. In an exemplary embodiment, the first flange 434 contacts (e.g., interfaces with) the top face 212 when the support rail 400 is coupled to the swing gear 206.

Opposite the first flange 434, the second flange 436 is configured to engage the rollers 208. The second flange 436 includes a contact surface 440 (e.g., face) configured to interface with or otherwise contact the rollers 208 when the support rail 400 is coupled to the swing gear 206 (as shown in FIG. 5). The contact surface 440 may be curved to match a curvature of the rollers 208 and/or be shaped to match one or more dimensions of the roller circle 202 and/or the rollers 208, such that the contact surface 440 contacts the rollers 208 substantially evenly around an inner circumference of the support rail 400. The contact surface 440 may be configured to receive a thrust load from the rollers 208. For instance, when the upper frame 102 rests on the rollers 208, the rollers 208 may be forced radially outward due to at least the weight of the upper frame 102. The support rail 400 is configured such that the rollers 208 contact the contact surface 440, applying a thrust load to the contact surface 440 (i.e., to the support rail 400) in response to the impact received from the upper frame 102. The second flange 436 (i.e., the support rail 400) may thus be configured to inhibit outward radial movement of the rollers 208, such as by receiving the thrust load from the rollers 208 and transferring the thrust load to the swing gear 206. Additionally, the first flange 434 is intended to inhibit rotational movement of the support rail 400 relative to the swing gear 206 in response to the thrust load, which may reduce or prevent a bending moment on the swing gear 206.

Still referring to FIGS. 4 through 6, the first flange 434 includes a bottom surface 422 (i.e., a first surface). The second flange 436 includes a bottom surface 424. The bottom surfaces 422 and 424 are positioned on opposite sides of the intersecting column portion 418. In an exemplary embodiment, the surfaces 422 and 424 are positioned approximately parallel to each other and approximately perpendicular to the column portion 418. For instance, according to FIGS. 5 and 6, the surfaces 422 and 424 are shown as substantially horizontal relative to the substantially vertical column portion 418. When the support rail 400 is coupled to the swing gear 206 (as shown in FIGS. 4 and 5), the bottom surface 422 is engaged with (e.g., interface or otherwise contact) the top face 212 of the swing gear 206. The bottom surface 422 may be substantially flat, such as to match a substantially flat top face 212, or the bottom surface 422 may include one or more features (e.g., ridges, contours, apertures, etc.) configured to match one or more features or dimensions of the top face 212. Similarly, the bottom surface 424 may be configured to contact the lower rail 216 (e.g., rail, plate, etc.) of the swing gear assembly 200 when the support rail 400 is coupled to the swing gear 206, and may also be substantially flat or include features configured to match one or more features or dimensions of the lower rail 216.

The column portion 418 of the support rail 400 is positioned within a channel 428 of the swing gear 206, between an inner surface 414 and the lower rail 216. The column portion 418 may be positioned within the channel 428 in order to limit movement of the support rail 400 relative to the swing gear 206, such as to inhibit a relative rotation of the support rail 400 about the top face 212. The column portion 418 may be sized according to one or more dimensions of the channel 428. The column portion 418 includes an outer surface 404 (i.e., a second surface) positioned opposite an inner surface 426 of the column portion 418. The surfaces 404 and 426 are substantially vertical according to the orientation shown in FIGS. 5 and 6, although the column portion 418, including the surfaces 404 and 426, may be curved to approximately match a shape of the swing gear 206, the rollers 208, and/or another related component. The surfaces 404 and 426 are also substantially perpendicular to the flanges 434 and 436 and the bottom surfaces 422 and 424.

While the inner surface 426 faces inward toward the central axis 214, the outer surface 404 faces outward from the support rail 400 and away from the central axis 214. When the support rail 400 is coupled to the swing gear 206 (as shown in FIGS. 4 and 5), the outer surface 404 is engaged with (e.g., interface or otherwise contact) the inner surface 414 of the swing gear 206. For instance, the outer surface 404 may interface with the inner surface 414 in order to inhibit relative movement of the support rail 400 relative to the swing gear 206. The outer surface 404 may include one or more features (e.g., ridges, contours, apertures, etc.) configured to match one or more features or dimensions of the inner surface 414. The outer surface 404 may also be otherwise sized and/or shaped according to one or more dimensions of the inner surface 414.

In the illustrated embodiment of FIGS. 5 and 6, the outer surface 404 and the first bottom surface 422 intersect at an approximate right angle such that the first flange 434 and the column portion 418 engage (e.g., interface with) the swing gear 206 simultaneously. In particular, the bottom surface 422 interfaces with the top face 212 of the swing gear 206, and the outer surface 404 interfaces with the inner surface 414 of the swing gear 206 simultaneously when the support rail 400 is coupled to the swing gear 206 (as shown in FIGS. 4 and 5). The support rail 400 is configured to engage the swing gear 206 at a horizontal surface and a vertical surface (according to FIG. 5) at least partly in order to inhibit or prevent a movement of the support rail 400 relative to the swing gear 206 (e.g., about the top face 212). When the support rail 400 is subjected to a thrust load from the rollers 208, the support rail 400 may be pushed radially outward toward the swing gear 206. The support rail 400 is configured to contact the swing gear 206 on both a horizontal surface (i.e., the top face 212) and a substantially perpendicular vertical surface (e.g., the inner surface 414), which may inhibit or prevent relative movement of the support rail 400 relative to the swing gear 206 (e.g., due to the thrust load). For instance, the engaged horizontal and vertical surfaces 422 and 404, respectively, may inhibit a relative rotation of the support rail 400 about the top face 212 of the swing gear 206, which may also reduce or inhibit a bending moment applied to the swing gear 206 (e.g., from the support rail 400).

Although the surfaces 212 and 414 are shown in FIG. 5 as being horizontal and vertical, respectively, in other embodiments the surfaces contacting the support rail 400 may be intersecting and substantially perpendicular to each other but in another orientation relative to the other related components. In these embodiments, the surfaces 404 and 422 of the support rail 400 are configured such that the support rail 400 engages the surfaces 212 and 414 simultaneously in response to a thrust load. In still other embodiments, the surfaces 212 and 414 may connect at another angle (i.e., an angle, a non-right angle, etc.). In these embodiments, the surfaces 404 and 422 may connect at a substantially similar angle or otherwise be sized or shaped to match one or more dimensions of the surfaces 212 and 414 such that the surfaces 404 and 422 engage the surfaces 414 and 212, respectively. For instance, the surfaces 212 and 414 may connect at a first angle, and the support rail 400 may be configured such that the surfaces 404 and 422 connect at a second angle, wherein the second angle is substantially similar to first angle such that the surfaces 404 and 422 are configured to engage the surfaces 212 and 414 simultaneously.

On the opposite (inner) side of the support rail 400, the inner surface 426 and the bottom surface 424 intersect at an approximate right angle such that the second flange 436 and the column portion 418 engage the lower rail 216. The surfaces 426 and 424 may also reduce a rotational movement of the support rail 400 relative to the swing gear 206, including the lower rail 216, by engaging the lower rail 216 at a horizontal and a vertical surface. The two contact surfaces 212 and 414 for the support rail 400 may also assist with proper placement or location of the support rail 400 relative to the swing gear 206 (e.g., such that the bottom surface 422 and the outer surface 404 interface with the top face 212 and the inner surface 414, respectively). Similarly, the surfaces 426 and 424 may also be used to locate the support rail 400 relative to the lower rail 216.

In the illustrated embodiment of FIGS. 4 and 5, the support rail 400 is coupled to the swing gear 206 using fasteners 412. The support rail 400 includes slots 410 (i.e., a plurality of slots) for receiving the fasteners 412. The slots 410 may extend through the first flange 434, extending from a top surface of the first flange 434 to the bottom surface 422. In this embodiment, the swing gear 206 also includes slots formed in the top face 212. The slots of the swing gear 206 may be sized or otherwise configured to match a dimension of the slots 410 and/or the fasteners 412. The slots of the swing gear 206 are configured to align with the slots 410 when the swing gear 206 and the support rail 400 are in the configuration shown in FIG. 5 in order to receive the fasteners 412 and couple the support rail 400 to the swing gear 206. In some embodiments, the slots 410 have a wide (e.g., loose) fit tolerance relative to the fasteners 412. In these embodiments, the fasteners 412 may be tension bolts, such that the support rail 400 is coupled to the swing gear 206 via a tension joint.

The support rail 400 may also be coupled to the swing gear 206 and/or the lower rail 216 using fasteners 420. The fasteners 420 may be substantially similar to the fasteners 412, or the fasteners 420 may be otherwise configured. The support rail 400 includes slots 416 for receiving the fasteners 420. The slots 416 may extend through the column portion 418 of the support rail 400. The swing gear 206 and the lower rail 216 may also include slots or partial slots sized or otherwise configured to match a dimension of the slots 416 and/or the fasteners 420. These slots may be configured to align with the slots 416 in order to receive the fasteners 420 and couple the support rail 400 to the swing gear 206. Any of the slots (e.g., slots 410, slots 416, etc.) may be threaded to receive and engage threads of the fasteners 412 and/or 420. The slots 410 and 416 may be substantially evenly spaced around the support rail 400 in order to couple the support rail 400 to the swing gear 206. In some embodiments, the slots 410 and 416 (and the fasteners 412 and 420) may be otherwise located on the support rail 400, such as to provide greater retention or resistance at a particular location on the support rail 400, or for additional clearance relative to another component.

The support rail 400 also includes slots 406 (i.e., a plurality of locating slots) configured to receive locating pins 408. The slots 406 and the pins 408 may be positioned on the support rail 400 in order to locate the support rail 400 relative to the swing gear 206, the lower rail 216, the rollers 208, and/or another related component. In an exemplary embodiment, the swing gear 206 includes holes or slots similar to the slots 406 in order to receive the pins 408, such that the pins 408 engage both the support rail 400 and the swing gear 206, locating the support rail 400 relative to the swing gear 206. The slots of the swing gear 206 are configured to align with the slots 406 when the support rail 400 is coupled to the swing gear 206. In some embodiments, the slots 406 have a narrow (e.g., small, tight, high precision) fit tolerance relative to the pins 408 in order to limit relative movement of the pins 408 when the pins 408 are fitted within the slots 406. The pins 408 may be configured to absorb or receive a lateral load related to the thrust load received from the rollers 208.

In some embodiments, the support rail 400 may also be welded to the swing gear 206. For instance, the support rail 400 may be welded to the top face 212 of the swing gear 206 such that the support rail 400 and the swing gear 206 are in a configuration similar to that shown in FIG. 5. In some embodiments, the support rail 400 is welded to the swing gear 206 at locations corresponding to the slots 406. For instance, the support rail 400 may be welded at the slots 406 to the top face 212 or to connect the slots 406 to corresponding slots of the swing gear 206 (e.g., in place of the pins 408). The welded portions of the support rail 400 and the swing gear 206 may be configured to receive a lateral load associated with the thrust load from the rollers 208.

The inner surface 414 of the swing gear 206 may also be machined to engage the support rail 400, such as to prevent relative movement of the support rail 400 and/or the swing gear 206 or to locate the support rail 400 relative to the swing gear 206. For instance, in the illustrated embodiment of FIG. 5, the swing gear 206 includes a ledge 432 (i.e., a machined portion) configured to interface with the outer surface 404 of the support rail 400. The ledge 432 may be machined or otherwise formed on the inner surface 414 in order to inhibit relative movement (e.g., rotation) of the support rail 400, such as to inhibit a bending moment of the support rail 400 on a top portion of the swing gear 206. The ledge 432 may contact the column portion 418, preventing or inhibiting downward movement of the support rail 400. In one embodiment, the column portion 418 and the ledge 432 may be sized and/or shaped according to one or more dimensions of the other, such as to maintain engagement between the two components or to assist in properly placing or locating the support rail 400. In other embodiments, the inner surface 414 and/or another surface of the swing gear 206 or the support rail 400 may be otherwise machined or formed to inhibit relative movement of the support rail 400 and/or the swing gear 206.

The construction and arrangement of the disclosed support rail and swing gear assembly, as shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

INDUSTRIAL APPLICABILITY

The disclosed support rail 400 and swing gear assembly 200 may be implemented into any large industrial vehicle having an upper frame (e.g., upper frame 102) configured to rotate relative to a coupled lower frame (e.g., lower frame 104) via a swing gear (e.g., swing gear 206). The support rail 400 may be implemented to receive a thrust load from an adjacent set of rollers (e.g., rollers 208) and retain a relative position of the rollers in response to the thrust load. The support rail 400 includes the horizontal surface 422 and the vertical surface 404, which are intended to engage the swing gear at a horizontal and a vertical surface, respectively. By engaging the swing gear on both a horizontal and a vertical surface, the support rail 400 may inhibit movement of the support rail 400 relative to the swing gear in more than one direction. In particular, the support rail 400 is intended to inhibit a rotational movement relative to an adjacent swing gear about a top face of the swing gear, which is intended to reduce or eliminate a bending moment applied to the top face of the swing gear by the support rail 400 (e.g., in response to a received thrust load).

The disclosed support rail 400 may also be implemented in order to assist in proper placement of the support rail 400 relative to the swing gear and the adjacent rollers. The horizontal surface 422 and the vertical surface 404 are intended to provide two locating surfaces for the support rail 400 relative to the swing gear. Similarly, the horizontal surface 424 and the vertical surface 426 of the support rail 400 are intended to provide two locating surfaces for the support rail 400 relative to a lower rail on the inner portion of the swing gear. The column portion 418 of the support rail 400 may also be intended to fit within a channel formed on the swing gear, in part to locate the support rail 400 relative to the swing gear. The support rail 400 also includes slots 406 configured to receive pins 408 intended to fit within both the support rail 400 and the swing gear to locate the support rail 400 relative to the swing gear.

It will be apparent to those skilled in the art that various modifications and variations can be made to the disclosed support rail and swing gear assembly. Other embodiments will be apparent to those skilled in the art from consideration of the specification and practice of the disclosed support rail and swing gear assembly. It is intended that the specification and examples be considered as exemplary only, with a true scope being indicated by the following claims and their equivalents.

What is claimed is:

1. A support rail for a swing gear, the support rail comprising:
    a first flange having a first surface configured to engage a substantially horizontal top face of the swing gear;
    a second flange positioned opposite the first flange;
    a column portion intersecting the first flange and the second flange such that the column portion is approximately perpendicular to the first and second flanges, wherein the column portion includes a second surface configured to engage a substantially vertical inner surface of the swing gear, and wherein the first surface and the second surface are configured to substantially inhibit a rotation of the support rail relative to the swing gear by engaging the top face and the inner surface simultaneously, thereby fastening the support rail to the swing gear.

2. The support rail of claim 1, wherein the first surface and the second surface are configured to inhibit a rotation of the support rail about the top face of the swing gear such that a bending moment applied to the swing gear is inhibited.

3. The support rail of claim 1, wherein the second flange is configured to receive a thrust load from a set of rollers, and wherein the first surface and the second surface are configured to substantially inhibit the rotation of the support rail relative the swing gear in response to receiving the thrust load.

4. The support rail of claim 3, wherein the first surface and the second surface are configured to transfer the thrust load from the set of rollers to the swing gear when the support rail is coupled to the swing gear.

5. The support rail of claim 1, wherein the column portion includes a plurality of slots for receiving fasteners to couple the column portion to the swing gear.

6. The support rail of claim 5, wherein the first flange includes a plurality of locating slots for receiving locating pins to locate the first flange relative to the swing gear.

7. A swing gear assembly, comprising:
    a swing gear having a substantially horizontal top face and a substantially vertical inner surface; and
    a support rail coupled to the swing gear, the support rail comprising:
        a first flange having a first surface engaging the top face;
        a second flange positioned opposite the first flange; and
        a column portion intersecting the first flange and the second flange such that the column portion is approximately perpendicular to the first and second flanges, wherein the column portion includes a second surface engaging the inner surface, and wherein the first surface and the second surface are configured to substantially inhibit a rotation of the support rail relative to the swing gear by engaging the top face and the inner surface simultaneously, thereby fastening the support rail to the swing gear.

8. The swing gear assembly of claim 7, further comprising:
    a set of rollers interfacing with the second flange and configured to deliver a thrust load to the second flange;
    wherein the first surface and the second surface are configured to substantially inhibit the rotation of the support rail relative to the swing gear in response to receiving the thrust load.

9. The swing gear assembly of claim 8, wherein the first surface and the second surface are configured to transfer the thrust load from the set of rollers to the swing gear.

10. The swing gear assembly of claim 7, wherein the first surface and the second surface are configured to inhibit a rotation of the support rail about the top face of the swing gear such that a bending moment applied to the swing gear is inhibited.

11. The swing gear assembly of claim 7, wherein the swing gear includes a channel at least partially formed by the inner surface, and wherein the column portion is received within the channel such that the second surface interfaces with the inner surface.

12. The swing gear assembly of claim 11, wherein the column portion and the channel each include slots that are aligned to receive fasteners, and wherein the support rail and the swing gear are coupled via the fasteners routed through the slots of the column portion and the channel.

13. The swing gear assembly of claim 7, wherein the first flange and the top face include slots that are aligned and configured to receive locating pins in order to locate the support rail relative to the swing gear.

14. The swing gear assembly of claim 7, wherein the inner surface includes a machined portion, and wherein the column portion is configured to engage with the machined portion in order to inhibit the rotation of the support rail relative to the swing gear.

15. The swing gear assembly of claim 7, wherein the top face and the inner surface connect to form a first angle, wherein the first surface and the second surface connect to form a second angle, and wherein the second angle is substantially similar to the first angle.

16. An industrial vehicle, comprising:
   a lower frame;
   an upper frame configured to rotate relative to the lower frame; and
   a swing gear assembly coupled to the lower frame and the upper frame and configured to facilitate a rotation of the upper frame relative to the lower frame, the swing gear assembly comprising:
      a swing gear having a substantially horizontal top face and a substantially vertical inner surface; and
      a support rail coupled to the swing gear and including a first flange having a first surface engaging the top face, a second flange positioned opposite the first flange, and a column portion intersecting the first flange and the second flange such that the column portion is approximately perpendicular to the first and second flanges, wherein the column portion includes a second surface engaging the inner surface, and wherein the first surface and the second surface are configured to substantially inhibit a rotation of the support rail relative to the swing gear by engaging the top face and the inner surface simultaneously, thereby fastening the support rail to the swing gear.

17. The industrial vehicle of claim 16, wherein the swing gear assembly further comprises:
   a set of rollers interfacing with the second flange, wherein the upper frame rests on the set of rollers and delivers an impact to the set of rollers such that the set of rollers applies a thrust load to the second flange;
   wherein the first surface and the second surface are configured to substantially inhibit the rotation of the support rail relative to the swing gear in response to receiving the thrust load from the set of rollers.

18. The industrial vehicle of claim 17, wherein the first surface and the second surface are configured to transfer the thrust load from the set of rollers to the swing gear.

19. The industrial vehicle of claim 16, wherein the swing gear includes a channel at least partially formed by the inner surface, and wherein the column portion is received within the channel such that the second surface interfaces with the inner surface.

20. The industrial vehicle of claim 16, wherein the top face and the inner surface connect to form a first angle, wherein the first surface and the second surface connect to form a second angle, and wherein the second angle is substantially similar to the first angle.

* * * * *